(12) United States Patent
Takahashi et al.

(10) Patent No.: US 7,515,448 B2
(45) Date of Patent: Apr. 7, 2009

(54) AC ADAPTER WHICH CAN BE REDUCED IN SIZE AND LOWERED IN PROFILE

(75) Inventors: Masahiko Takahashi, Sendai (JP); Satoshi Arai, Sendai (JP)

(73) Assignee: NEC TOKIN Corp., Sendai-shi (JP)

( * ) Notice: Subject to any disclaimer, the term of this patent is extended or adjusted under 35 U.S.C. 154(b) by 272 days.

(21) Appl. No.: 11/238,360

(22) Filed: Sep. 29, 2005

(65) Prior Publication Data
US 2006/0071647 A1 Apr. 6, 2006

(30) Foreign Application Priority Data
Oct. 1, 2004 (JP) ............. 2004-289631
Jun. 17, 2005 (JP) ............. 2005-178112

(51) Int. Cl.
*H02M 1/00* (2007.01)
*H05K 7/00* (2006.01)

(52) U.S. Cl. ............ 363/146; 361/760; 361/761; 361/763

(58) Field of Classification Search ............... 363/146, 363/147; 361/734, 760–765, 782–785, 807–811
See application file for complete search history.

(56) References Cited

U.S. PATENT DOCUMENTS

| | | | | |
|---|---|---|---|---|
| 5,319,342 A | * | 6/1994 | Kuroki | 336/170 |
| 5,460,531 A | * | 10/1995 | Vivio | 439/70 |
| 5,547,399 A | * | 8/1996 | Naghi et al. | 439/623 |
| 5,818,705 A | | 10/1998 | Faulk | |
| 5,959,830 A | * | 9/1999 | Inagawa et al. | 361/502 |
| 6,011,684 A | * | 1/2000 | Devoe et al. | 361/321.1 |
| 6,086,395 A | | 7/2000 | Lloyd et al. | |
| 6,272,030 B1 | * | 8/2001 | Oomura | 363/62 |
| 6,392,523 B1 | * | 5/2002 | Tsunemi | 336/192 |
| 6,549,418 B1 | * | 4/2003 | Deeney | 361/736 |
| 6,549,429 B2 | * | 4/2003 | Konno | 363/21.04 |

(Continued)

FOREIGN PATENT DOCUMENTS

CN 1496214 A 5/2004

(Continued)

OTHER PUBLICATIONS

R. Kollman and J. Betten; "Why Use a Wall Adapter for AC Input Power?"; 2002; Texas Instruments Inc. Analog Application Journal; pp. 18-22.*

(Continued)

*Primary Examiner*—Jessica Han
*Assistant Examiner*—Emily Pham
(74) *Attorney, Agent, or Firm*—Frishauf, Holtz, Goodman & Chick, P.C.

(57) ABSTRACT

In an AC adapter provided with a circuit board having first and second surfaces opposite to each other in a thickness direction, a transformer portion is mounted on the circuit board. A secondary capacitor is connected to an output side of the transformer portion. The secondary capacitor has a low profile and extending in parallel to the circuit board. Thus, the AC adapter as a whole is reduced in external size. Preferably, the transformer portion is mounted on the first surface while the secondary capacitor is mounted on the second surface.

18 Claims, 3 Drawing Sheets

U.S. PATENT DOCUMENTS

| | | |
|---|---|---|
| 6,580,624 B2 | 6/2003 | Arai |
| 6,853,558 B1 * | 2/2005 | Dixon ......................... 361/761 |
| 6,865,094 B2 * | 3/2005 | Malik et al. ............... 363/21.12 |
| 6,912,136 B2 * | 6/2005 | Thrap ....................... 363/21.01 |
| 6,970,065 B2 | 11/2005 | Sakai et al. |
| 2002/0154528 A1 * | 10/2002 | Ravid ......................... 363/146 |
| 2003/0137814 A1 * | 7/2003 | Kucharski ................... 361/780 |
| 2004/0050842 A1 | 3/2004 | Han et al. |
| 2004/0164714 A1 * | 8/2004 | Hayashi ...................... 320/137 |

FOREIGN PATENT DOCUMENTS

| | | |
|---|---|---|
| EP | 0 848 396 A1 | 6/1998 |
| JP | 2001-268904 A | 9/2001 |
| KR | 1983-0002107 Y1 | 10/1983 |
| KR | 2004-0024393 A | 3/2004 |
| TW | 345348 | 11/1998 |
| TW | 350075 | 1/1999 |
| TW | 460880 B | 10/2001 |
| WO | WO 01/10006 A1 | 2/2001 |
| WO | WO 2004/027792 A1 | 4/2004 |

OTHER PUBLICATIONS

Taiwanese Search Report dated Dec. 21, 2007 issued in a counterpart Taiwanese application.

* cited by examiner

RELATED TECHNIQUE

RELATED TECHNIQUE

RELATED TECHNIQUE

RELATED TECHNIQUE

AC ADAPTER WHICH CAN BE REDUCED IN SIZE AND LOWERED IN PROFILE

This application claims priority to prior Japanese applications JP 2004-289631 and JP 2005-178112, the disclosures of which are incorporated herein by reference.

BACKGROUND OF THE INVENTION

This invention relates to an AC adapter for use in a switching power supply circuit or the like.

For example, an AC adapter of the type comprises various electronic parts or components mounted on a circuit board and including a transformer portion, a primary capacitor connected to an input side of the transformer portion, and a secondary capacitor connected to an output side of the transformer portion (for example, see Japanese Unexamined Patent Application Publication (JP-A) No. 2001-268904).

When the various electronic components are mounted on the circuit board, it is attempted in various manners to reduce the size or lower the profile of the AC adapter. For example, with reference to a highest one of the electronic components, the remaining electronic components are designed to be high, thereby reducing a mounting area required to mount the electronic components. Alternatively, with reference to a lowest one of the electronic components, the remaining electronic components are designed to be low, thereby lowering the AC adapter in profile.

However, each of the transformer portion and the secondary capacitor is complicated in shape and requires a large mounting area or a large mounting volume. It is therefore difficult to efficiently arrange those components on the circuit board. Further, relative to an area or a volume available for mounting the electronic components, a number of the electronic components is not small. Therefore, it is difficult to fully respond to a recent demand for a small size and a low profile of the AC adapter.

Referring to FIGS. 1A and 1B, description will be made of a mounting structure of various electronic components in an existing AC adapter (which is not an invention known from a publication but is a generally-used technique).

Most of the electronic components, i.e., three filter portions 21, a primary rectifier circuit portion 22, a switching circuit portion 23, a transformer portion 24, a secondary rectifier circuit portion 25, a primary capacitor 26a, a secondary capacitor 26b, and two voltage change detecting circuit portions 27 are disposed on one surface of a printed circuit board 20. As a remaining part of the electronic components, a control circuit portion 28 is disposed on an opposite surface of the printed circuit board 20 at a predetermined position, i.e., a position substantially faced to one of the filter portions 21.

Upon disposing the electronic components on the printed circuit board 20, a mounting area of the printed circuit board 20 is determined by a total size of mounting surfaces of the electronic components. A height of the AC adapter as a whole is determined by a height of a highest one of the electronic components (herein, the transformer portion 24). Therefore, even if the mounting area of the printed circuit board 20 can be reduced, the height of the AC adapter can not be reduced and a useless space is left. Thus, it is difficult to reduce an external size of the AC adapter as a whole.

Referring to FIGS. 2A and 2B, description will be made of another mounting structure of various electronic components in another existing AC adapter (which is not an invention known from a publication but is a generally-used technique).

As compared with the printed circuit board 20 illustrated in FIGS. 1A and 1B, a printed circuit board 20' has a wider mounting area.

Most of the electronic components, i.e., three filter portions 21', a primary rectifier circuit portion 22', a switching circuit portion 23', a transformer portion 24', a secondary rectifier circuit portion 25', a primary capacitor 26a', a secondary capacitor 26b', and two voltage change detecting circuit portions 27 are disposed on one surface of the printed circuit board 20'. As a remaining part of the electronic components, a control circuit portion 28 is disposed on an opposite surface of the printed circuit board 20' at a predetermined position, i.e., a position substantially faced to one of the filter portions 21'.

Each of the filter portions 21', the primary rectifier circuit portion 22', the switching circuit portion 23', the transformer portion 24', the secondary rectifier circuit portion 25', the primary capacitor 26a', and the secondary capacitor 26b' is designed to have a low profile and is arranged so that the AC adapter has a low profile, as will be understood from comparison between FIGS. 1B and 2B.

However, although the AC adapter as a whole can be reduced in thickness and lowered in profile, the mounting area is inevitably increased because all of the electronic components are surface-mounted on the printed circuit board. It is therefore difficult to reduce an external size of the AC adapter as a whole.

SUMMARY OF THE INVENTION

It is therefore an object of this invention to provide an AC adapter which can be reduced in size and lowered in profile.

It is another object of this invention to achieve the above-mentioned object by appropriately designing a shape and a capacitance of a secondary capacitor, a shape of a transformer portion, and a mounting pattern of these components on a printed circuit board.

Other objects of the present invention will become clear as the description proceeds.

According to an aspect of the present invention, there is provided an AC adapter which comprises a circuit board having first and second surfaces opposite to each other in a thickness direction of the circuit board, a transformer portion mounted on the circuit board, and a secondary capacitor connected to an output side of the transformer portion, the secondary capacitor having a low profile and extending in parallel to the circuit board, the AC adapter as a whole being reduced in external size.

DESCRIPTION OF THE PREFERRED EMBODIMENTS

Figure 3:
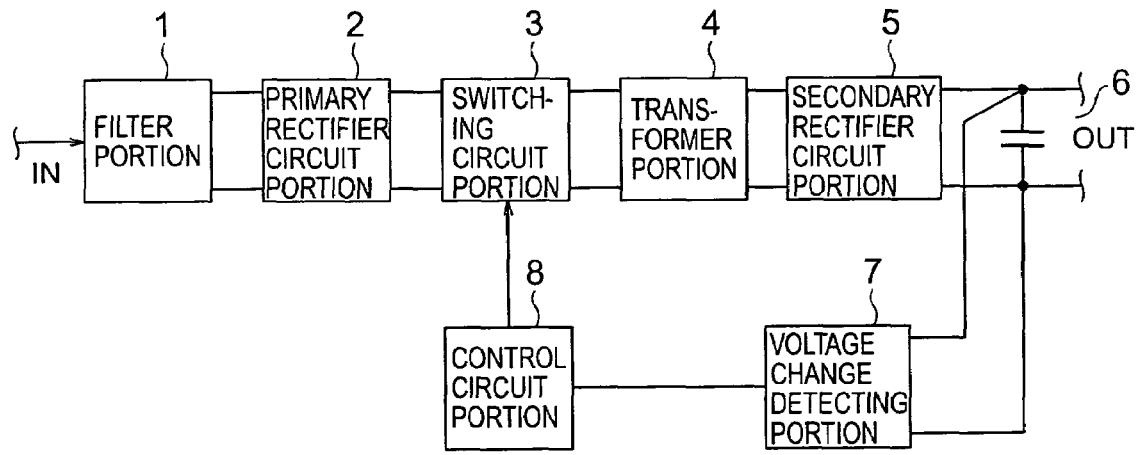
FIG. 3 is a circuit block diagram showing an AC adapter according to a first embodiment of this invention.

Referring to FIG. 3, description will be made of an AC adapter according to a first embodiment of this invention.

The AC adapter illustrated in the figure is for use in a switching power supply circuit or the like and comprises various electronic components, such as a filter portion 1, a primary rectifier circuit portion 2, a switching circuit portion 3, a transformer portion 4, a secondary rectifier circuit portion 5, a secondary capacitor 6, a voltage change detecting portion 7, and a control circuit portion 8. Although not shown in FIG. 3, the AC adapter practically comprises other chip parts or components such as a resistor, a capacitor, and a diode as a part of the electronic components.

The filter portion 1 serves to prevent introduction of noise from an input side and to suppress noise generated from a switching power supply and fed back to an input power supply. The filter portion 1 produces an a.c. filter output. The primary rectifier circuit portion 2 is connected to the filter portion 1 and produces a rectified voltage by full-wave or half-wave rectification of the filter output.

The switching circuit portion 3 is connected to the primary rectifier circuit portion 2 and the control circuit portion 8. In response to a control signal supplied from the control circuit portion 8, the switching circuit portion 3 controls on and off of the rectified voltage to produce an a.c. voltage having a pulse width corresponding to the control signal. The switching circuit portion 3 comprises a switching device portion. The transformer portion 4 is connected to the switching circuit portion 3 and transforms the a.c. voltage from the switching circuit portion 3 into an a.c. voltage having a predetermined value.

The secondary rectifier circuit portion 5 is connected to the transformer portion 4 and rectifies the a.c. voltage obtained by the transformer portion 4 to produce a pulse voltage. The secondary capacitor 6 is connected to the secondary rectifier circuit portion 5 and smoothes the pulsating voltage to produce a d.c. voltage. For example, as the secondary capacitor 6, use may be made of an aluminum electrolytic capacitor having a large size and a large capacitance of 900 μF or more, specifically, about 1000 μF.

The voltage change detecting portion 7 detects a change in d.c. voltage as an output voltage and produces a detection signal. The control circuit portion 8 produces the control signal having the pulse width based on the detection signal and supplies the control signal to the switching circuit portion 3.

Figures 4A, 4B:
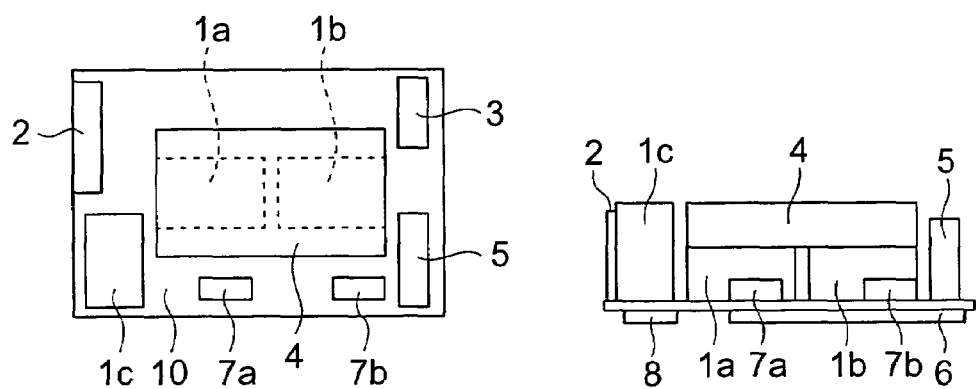
FIG. 4A is a top view showing the AC adapter in FIG. 3 with various electronic components mounted thereto.
FIG. 4B is a side view corresponding to FIG. 4A.

Referring to FIGS. 4A and 4B, description will be made of a mounting state of the electronic components in the AC adapter illustrated in FIG. 3. Herein, small-sized parts such as a chip resistance and a chip capacitor are not shown in the figures.

In the AC adapter, the secondary capacitor 6 has a low profile with a thickness of 2 mm or less and a large capacitance of about 1000 μF. The transformer portion 4 has a flat shape with a thickness of 20 mm or less. In addition to appropriately designing the shape of each of the transformer portion 4 and the secondary capacitor 6, a mounting pattern of the electronic components on a printed circuit board 10 is appropriately determined so as to increase a mounting density, thereby achieving a small external size and a light weight of the AC adapter as a whole and an increased power density (output power per unit volume). The printed circuit board 10 has first and second surfaces opposite to each other in a thickness direction.

The description will be made more in detail. As a part of the electronic components, three filter members 1a, 1b, and 1c, the primary rectifier circuit portion 2, the switching circuit portion 3, the secondary rectifier circuit portion 5, and two voltage change detecting members 7a and 7b are disposed at predetermined positions on the first surface of the printed circuit board 10. Two of the filter members 1a-1c are located adjacent to each other. A combination of the three filter members 1a-1c serves as the filter portion 1. A combination of the two voltage change detecting members 7a and 7b serves as the voltage change detecting portion 7.

As another part of the electronic components, the secondary capacitor 6 and the control circuit portion 8, each of which has a low profile, are disposed at predetermined positions on the second surface of the printed circuit board 10. Further, as a remaining part of the electronic components, the transformer portion 4 having a low profile is placed or stacked on the two adjacent filter members 1a and 1b. Thus, the low-profile, small-sized, and light-weight AC adapter having a thickness of 25 mm or less as a whole is obtained. It is noted here that each of the first and the second surfaces of the printed circuit board 10 has an area, i.e., a mounting area which is considerably smaller than that of the printed circuit board 20 illustrated in FIGS. 1A and 1B.

In the above-mentioned AC adapter, the transformer portion 4 is disposed on the first surface of the printed circuit board 10 while the secondary capacitor 6 is disposed on the second surface. Between the transformer portion 4 and the secondary capacitor 6 each of which has a low profile, several electronic components at least including the two filter members 1a and 1b are interposed. Thus, the AC adapter has a portion of a two-tier or a three-tier structure so that the mounting area is reduced. In addition, the electronic components are lowered in profile and reduced in size so that a mounting volume is reduced. It is therefore possible to increase the mounting density. Further, it is unnecessary to provide a primary capacitor on the input side of the transformer portion 4. In this respect also, the AC adapter can be reduced in size and weight.

Figure 1A:
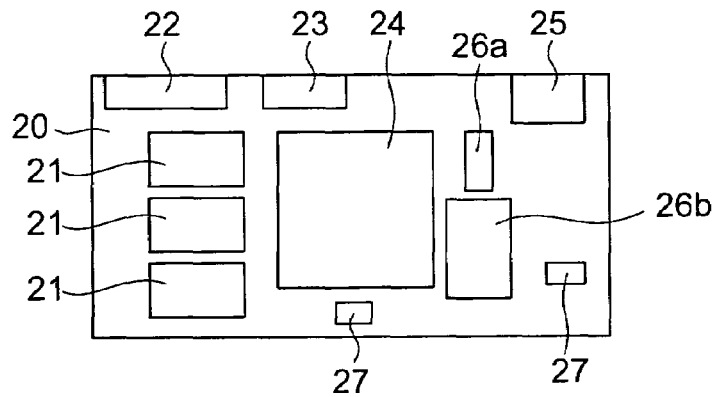
FIG. 1A is a top view showing a mounting structure of various electronic components in an existing AC adapter.
Figure 1B:
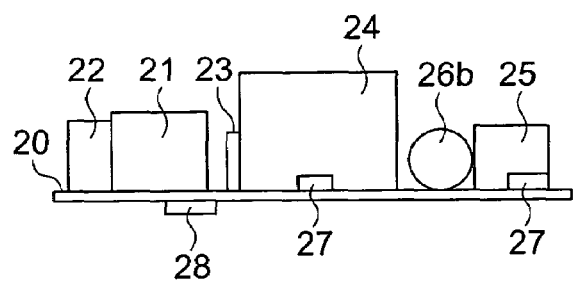
FIG. 1B is a side view corresponding to FIG. 1A.

As compared with the AC adapter illustrated in FIGS. 1A and 1B, the AC adapter illustrated in FIGS. 4A and 4B is reduced in external size as a whole to about 40%. The AC adapter illustrated in FIGS. 1A and 1B has a power density (output power per unit volume) of about 0.27 W/cc. On the other hand, the AC adapter illustrated in FIGS. 4A and 4B has a power density of 0.3 W/cc or more, specifically, 0.69 W/cc. Further, the AC adapter illustrated in FIGS. 4A and 4B is considerably reduced in weight.

The AC adapter illustrated in FIGS. 4A and 4B has a structure in which the capacitor, i.e., the secondary capacitor 6, is provided only on an output side of the transformer portion 4. Such an AC adapter for a switching power supply circuit without a primary capacitor may be called a C-less converter. As the secondary capacitor 6, use may be made of a large-capacitance capacitor recently developed and having a capacitance of about 1000 μF.

If at least one of the transformer portion 4 and the secondary capacitor 6 is lowered in profile, the AC adapter as a whole can be reduced in size. The foregoing description has been directed to the structure in which the printed circuit board 10 is interposed between the transformer portion 4 and the secondary capacitor 6. However, the printed circuit board 10 need not be disposed between these electronic components. For example, the secondary capacitor 6 may be disposed on the transformer portion 4. As far as the AC adapter has a three-tier structure capable of reducing the mounting area of the electronic components on the printed circuit board 10, lowering the profile, and reducing the external size of the AC adapter as a whole, the secondary capacitor 6, the transformer portion 4, and the printed circuit board 10 may be stacked in any order. As the secondary capacitor 6, an electric double-layer capacitor or an electrolytic capacitor can be suitably used.

Figure 5:
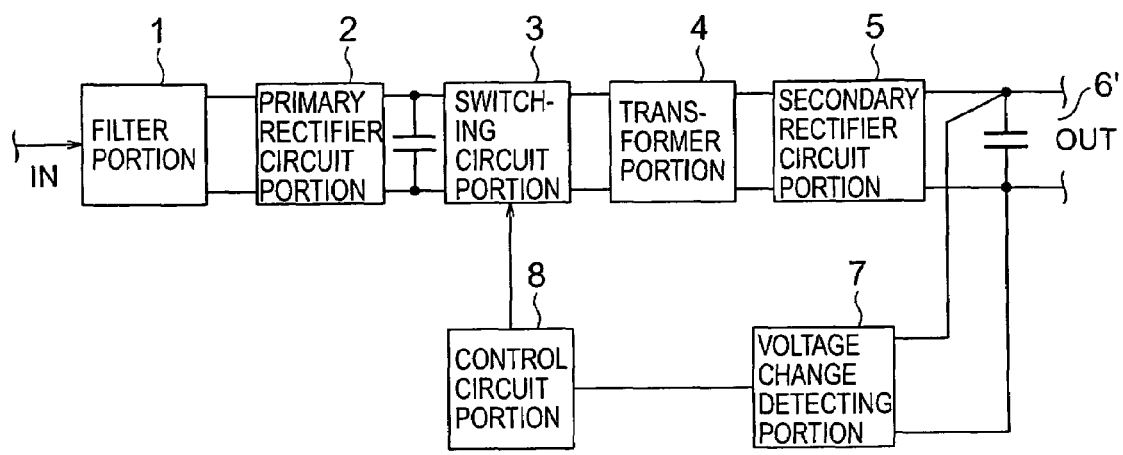
FIG. 5 is a circuit block diagram showing an AC adapter according to a second embodiment of this invention.

Referring to FIG. 5, description will be made of an AC adapter according to a second embodiment of this invention. Similar parts are designated by like reference numerals and description thereof will be omitted.

The AC adapter illustrated in the figure is also for use in a switching power supply circuit or the like and comprises various electronic components, such as a filter portion 1, a primary rectifier circuit portion 2, a switching circuit portion 3 comprising a switching device portion, a transformer portion 4, a secondary rectifier circuit portion 5, a secondary capacitor 6', a voltage change detecting portion 7, a control circuit portion 8, and a primary capacitor 9. Although not shown in FIG. 5, the AC adapter practically comprises other chip parts or components such as a resistor, a capacitor, and a diode as a part of the electronic components.

The primary capacitor 9 is connected between the primary rectifier circuit portion 2 as an input side of the transformer portion 4 and the switching circuit portion 3 and serves to smooth a pulsating voltage. Specifically, the primary capacitor 9 is inserted downstream of the primary rectifier circuit portion 2 and serves to share the load of smoothing the pulsating voltage which is imposed only upon the secondary capacitor 6 in FIG. 3. Specifically, the primary capacitor 9 is implemented by an aluminum electrolytic capacitor having a capacitance of 100 µF or less. The primary capacitor 9 having an excessively large capacitance is unfavorable because its size is increased to make it difficult to reduce the external size of the AC adapter as a whole.

It is assumed that the total energy of the primary capacitor 9 and the secondary capacitor 6' is equal to the energy of the secondary capacitor 6 in FIG. 3. In this event, the capacitance of the secondary capacitor 6' can be decreased by an amount corresponding to the capacitance of the primary capacitor 9. It is therefore possible to further reduce the size (lower the profile) of the secondary capacitor 6'. For example, if the primary capacitor 9 has a capacitance of 80 µF, the capacitance of the secondary capacitor 6' can be reduced to 920 µF.

Figures 6A, 6B:
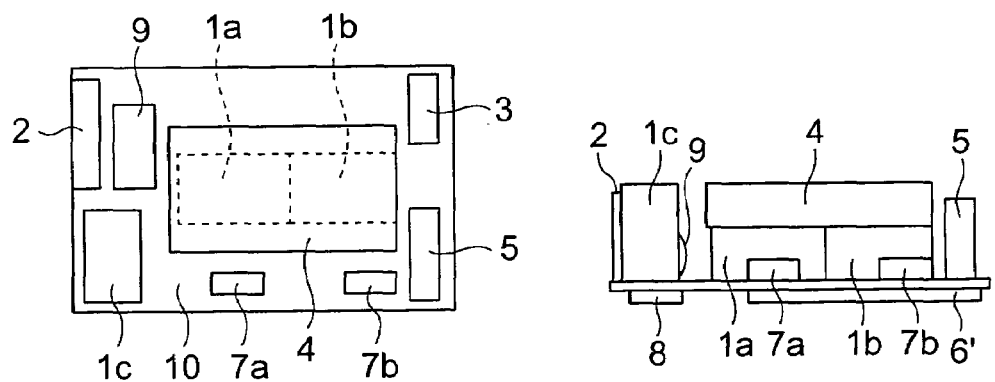
FIG. 6A is a top view showing the AC adapter in FIG. 5 with various electronic components mounted thereto.
FIG. 6B is a side view corresponding to FIG. 6A.

Referring to FIGS. 6A and 6B, description will be made of a mounting state of the electronic components in the AC adapter illustrated in FIG. 5. Herein, small-sized parts such as a chip resistance and a chip capacitor are not shown in the figures.

Figure 2A:
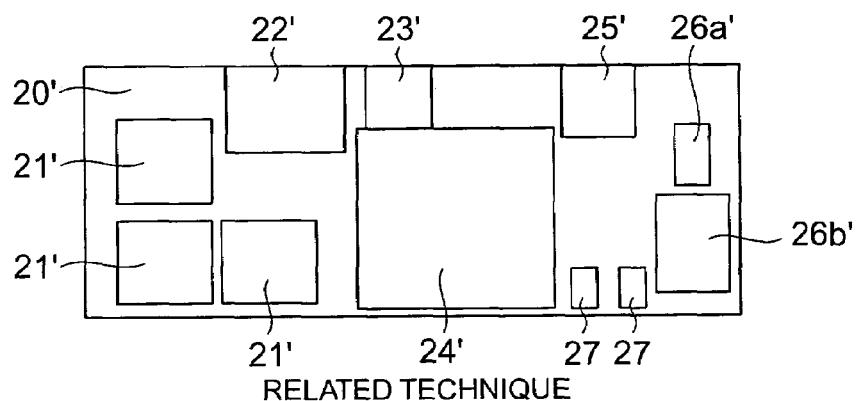
FIG. 2A is a top view showing another mounting structure of various electronic components in another existing AC adapter.
Figure 2B:
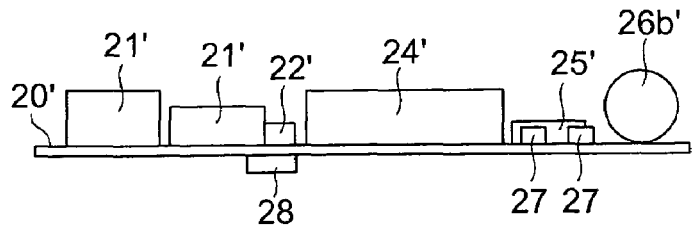
FIG. 2B is a side view corresponding to FIG. 1A.

In the AC adapter, the secondary capacitor 6' has a low profile with a thickness of 2 mm or less (slightly thinner than the secondary capacitor 6) and a large capacitance of 900 µF or more. The transformer portion 4 has a flat shape with a thickness of 20 mm or less. Further, the shape of each of the transformer portion 4 and the secondary capacitor 6' is appropriately designed. As the primary capacitor 9, use is made of a capacitor having a relatively small external size and having a capacitance of about 100 µF. By appropriately determining a mounting pattern of the electronic components on a printed circuit board 10, the mounting density is increased so that the AC adapter as a whole is reduced in external size and weight. The primary capacitor 9 may have a capacitance exceeding 100 µF but, preferably, has a size smaller than that of the primary capacitor 26a in FIG. 1A or the primary capacitor 26a' in FIG. 2A.

As compared with the secondary capacitor 6 in FIGS. 4A and 4B, the secondary capacitor 6' in FIGS. 6A and 6B similarly arranged is slightly lower in profile and slightly smaller in capacitance. Further, on a first surface of the printed circuit board 10, two filter members 1a and 1b disposed directly underneath the transformer portion 4 are closely adjacent to each other and, together with the two voltage change detecting members 7a and 7b, are slightly shifted to positions nearer to the switching circuit portion 3 and the secondary rectifier circuit portion 5. The primary capacitor 9 is disposed in a space surrounded by one of the two filter members 1a and 1b disposed directly underneath the transformer portion 4, the remaining filter members 1c, and the primary rectifier circuit portion 2. A combination of the three filter members 1a-1c serves as the filter portion 1. A combination of the two voltage change detecting members 7a and 7b serves as the voltage change detecting portion 7.

The AC adapter in FIGS. 6A and 6B is substantially similar in structure to the AC adapter illustrated in FIGS. 4A and 4B except that the primary capacitor 9 is disposed on the printed circuit board 10 in the space surrounded by some other electronic components. Therefore, the external shape is not substantially changed and the thickness as a whole is similarly unchanged and equal to 25 mm or less. Thus, the AC adapter is lowered in profile, reduced in size, and further increased in mounting density. As a consequence, the AC adapter in FIGS. 6A and 6B is reduced in size and weight and is yet equivalent in standard and performance to the AC adapter illustrated in FIGS. 4A and 4B. As the secondary capacitor 6', an electric double-layer capacitor or an electrolytic capacitor can be suitably used.

While the present invention has thus far been described in connection with a few preferred embodiments thereof, it will readily be possible for those skilled in the art to put this invention into practice in various other manners. Although the transformer portion is stacked on the filter member in each of FIGS. 4B and 6B, the filter member may be stacked on the transformer portion.

What is claimed is:

1. An AC adapter comprising:
   a circuit board having first and second surfaces opposite to each other in a thickness direction of the circuit board;
   a transformer portion mounted on the circuit board;
   a secondary capacitor mounted on the circuit board and connected to an output side of the transformer portion;
   a filter portion mounted on the circuit board, wherein the filter portion and the transformer portion are stacked on each other; and
   a plurality of additional electronic components mounted on the circuit board,
   wherein the secondary capacitor has a low profile and extends substantially in parallel to the circuit board, and
   wherein the transformer portion and the secondary capacitor are arranged to at least partially overlap each other in the thickness direction so as to form an at least two-tier structure having substantially a same height as a highest one of the plurality of additional electronic components.

2. The AC adapter according to claim 1, wherein the secondary capacitor has a capacitance of 900 µF or more.

3. The AC adapter according to claim 1, wherein the transformer portion has a flat shape with a thickness of 20 mm or less.

4. The AC adapter according to claim 1, wherein the circuit board is interposed between the transformer portion and the secondary capacitor, and the transformer portion is mounted on the first surface of the circuit board and the secondary capacitor is mounted on the second surface of the circuit board.

5. The AC adapter according to claim 1, wherein the secondary capacitor is disposed on the transformer portion to form the two-tier structure.

6. The AC adapter according to claim 1, further comprising a primary capacitor connected to an input side of the transformer portion.

7. The AC adapter according to claim 6, wherein the primary capacitor has a capacitance of 100μF or less.

8. The AC adapter according to claim 1, wherein the transformer portion and a primary capacitor are mounted on the first surface of the circuit board and the secondary capacitor is mounted on the second surface of the circuit board.

9. The AC adapter according to claim 1, wherein the AC adapter has a size of 25 mm or less in the thickness direction.

10. The AC adapter according to claim 1, wherein the secondary capacitor is an electric double-layer capacitor.

11. The AC adapter according to claim 1, wherein the secondary capacitor is an electrolytic capacitor.

12. The AC adapter according to claim 1, wherein the AC adapter has a power density of 0.3 W/cc.

13. The AC adapter according to claim 1, wherein the filter portion comprises a plurality of filter members mounted on the first surface of the circuit board adjacent to one another, and wherein the transformer portion is stacked on the filter members.

14. An AC adapter comprising:
a circuit board having first and second surfaces opposite to each other in a thickness direction of the circuit board;
a transformer portion mounted on the circuit board;
a secondary capacitor mounted on the circuit board and connected to an output side of the transformer portion; and
a plurality of additional electronic components mounted on the circuit board;
wherein the secondary capacitor has a low profile and extends substantially in parallel to the circuit board;
wherein the transformer portion and the secondary capacitor are arranged to at least partially overlap each other in the thickness direction so as to form an at least two-tier structure having substantially a same height as a highest one of the plurality of additional electronic components; and
wherein the AC adapter further comprises:
a filter portion mounted on the circuit board;
a switching circuit portion connected to an input side of the transformer portion;
a primary rectifier circuit portion connected between the switching circuit portion and the filter portion;
a secondary rectifier circuit portion connected to the output side of the transformer portion;
a voltage change detecting portion connected to the secondary capacitor; and
a control circuit portion connected to the voltage change detecting portion and the switching circuit portion,
wherein each of the switching circuit portion, the primary rectifier circuit portion, the secondary rectifier circuit portion, and the voltage change detecting portion are mounted on the first surface of the circuit board, and each of the secondary capicitor and the control circuit portion are mounted on the second surface of the circuit board.

15. The AC adapter according to claim 14, further comprising a primary capacitor connected between the switching circuit portion and the primary rectifier circuit portion, and wherein the primary capacitor is mounted on the first surface of the circuit board.

16. An AC adapter according to claim 15, wherein said filter portion comprises a plurality of filter members mounted on the first surface of the circuit board adjacent to one another, wherein the transformer portion is stacked on the filter members, and wherein the primary capacitor is placed between the primary rectifier circuit portion and at least one of the filter members located under the transformer portion.

17. An AC adapter comprising:
a circuit board having first and second surfaces opposite to each other in a thickness direction of the circuit board;
a transformer portion mounted on the circuit board;
a secondary capacitor mounted on the circuit board and connected to an output side of the transformer portion; and
plurality of additional electronic components mounted on the circuit board;
wherein the secondary capacitor has a low profile and extends substantially in parallel to the circuit board;
wherein the transformer portion and the secondary capacitor are arranged to at least partially overlap each other in the thickness direction so as to form an at least two-tier structure having substantially a same height as a highest one of the plurality of additional electronic components; and
wherein the AC adapter further comprises:
a filter portion mounted on the circuit board, and wherein the transformer portion, the secondary capacitor, and the filter portion are arranged to at least partially overlap each other in the thickness direction so as to form a three-tier structure.

18. The AC adapter according to claim 17, wherein the transformer portion and the filter portion are stacked adjacent to each other.

* * * * *